United States Patent
Berthold et al.

(10) Patent No.: US 7,603,572 B2
(45) Date of Patent: Oct. 13, 2009

(54) VOLTAGE STABILIZER STABILIZING THE VOLTAGE OF A POWER LINE WHEREIN POWER CONSUMPTION ELEMENTS ARE INDIVIDUALLY ACTIVATED BASED ON A QUANTITY OF CURRENTS TO BE DRAINED

(75) Inventors: Jörg Berthold, München (DE); Stephan Henzler, München (DE)

(73) Assignee: Infineon Technologies AG, Munich (DE)

(*) Notice: Subject to any disclaimer, the term of this patent is extended or adjusted under 35 U.S.C. 154(b) by 494 days.

(21) Appl. No.: 11/473,532

(22) Filed: Jun. 23, 2006

(65) Prior Publication Data

US 2007/0001878 A1 Jan. 4, 2007

(30) Foreign Application Priority Data

Jun. 23, 2005 (DE) .................. 10 2005 029 110

(51) Int. Cl.
G06F 1/00 (2006.01)
G06F 11/30 (2006.01)
G05F 1/10 (2006.01)

(52) U.S. Cl. .................. 713/300; 713/340; 327/540
(58) Field of Classification Search .................. 713/300
See application file for complete search history.

(56) References Cited

U.S. PATENT DOCUMENTS

| 4,811,190 | A | * | 3/1989 | Keir et al. ............. 363/60 |
| 5,825,207 | A | * | 10/1998 | Ito ........................ 326/83 |
| 6,717,389 | B1 | | 4/2004 | Johnson |
| 6,879,140 | B2 | * | 4/2005 | Elkin et al. ............ 323/303 |
| 7,038,529 | B2 | | 5/2006 | Ozeki et al. |
| 2003/0015996 | A1 | | 1/2003 | Pohlman et al. |
| 2005/0146378 | A1 | | 7/2005 | Ozeki et al. |

FOREIGN PATENT DOCUMENTS

| DE | 34 02 342 C2 | 5/1986 |
| EP | 1 172 923 A1 | 1/2002 |
| WO | WO 2004/034169 A1 | 4/2004 |

* cited by examiner

Primary Examiner—Suresh K Suryawanshi
(74) Attorney, Agent, or Firm—Brinks Hofer Gilson & Lione (57) ABSTRACT

A digital circuit unit includes at least one circuit block, a voltage source for supplying the circuit block, a detection unit, which monitors the change of current drain by the at least one circuit block, an additional power consumption unit, which upon activation consumes power in addition to the at least one circuit block, and a control unit, which controls the power consumption unit in such a way that upon a change in the power consumption of the circuit block the power consumption unit is activated and drains current.

34 Claims, 8 Drawing Sheets

PRIOR ART

VOLTAGE STABILIZER STABILIZING THE VOLTAGE OF A POWER LINE WHEREIN POWER CONSUMPTION ELEMENTS ARE INDIVIDUALLY ACTIVATED BASED ON A QUANTITY OF CURRENTS TO BE DRAINED

PRIORITY CLAIM

This application claims the benefit of priority of German Patent Application No. DE 10 2005 029 110.4, filed Jun. 23, 2005, the contents of which are incorporated herein.

BACKGROUND

1. Technical Field

The present invention relates to digital circuit control, and particularly to a voltage stabilizer and a method for controlling a digital circuit unit.

2. Background Information

To ensure reliable operation of devices that contain digital circuits, fluctuations in the supply voltage must be taken into account in the design of digital circuit units. These fluctuations are partially caused by the voltage generator, and are partially attributable to the voltage drop in the wiring for the on-chip power supply.

The fluctuations of the voltage generators have static and dynamic portions. The static portion can be 10-20 mV, for example, and is attributable to tolerances of the components in the control loop for the voltage. The dynamic portion in the fluctuations is primarily attributable to load change. In conventional circuits, load changes with factors of up to 10 are quite usual, attributable, for example, to the switching over between different operating modes. For example, these load changes can result from a change of operating mode between low processing capacity and an operating mode with high processing capacity. The arising load change can occur from one clock to the next, which means within a few nanoseconds.

Figure 1:
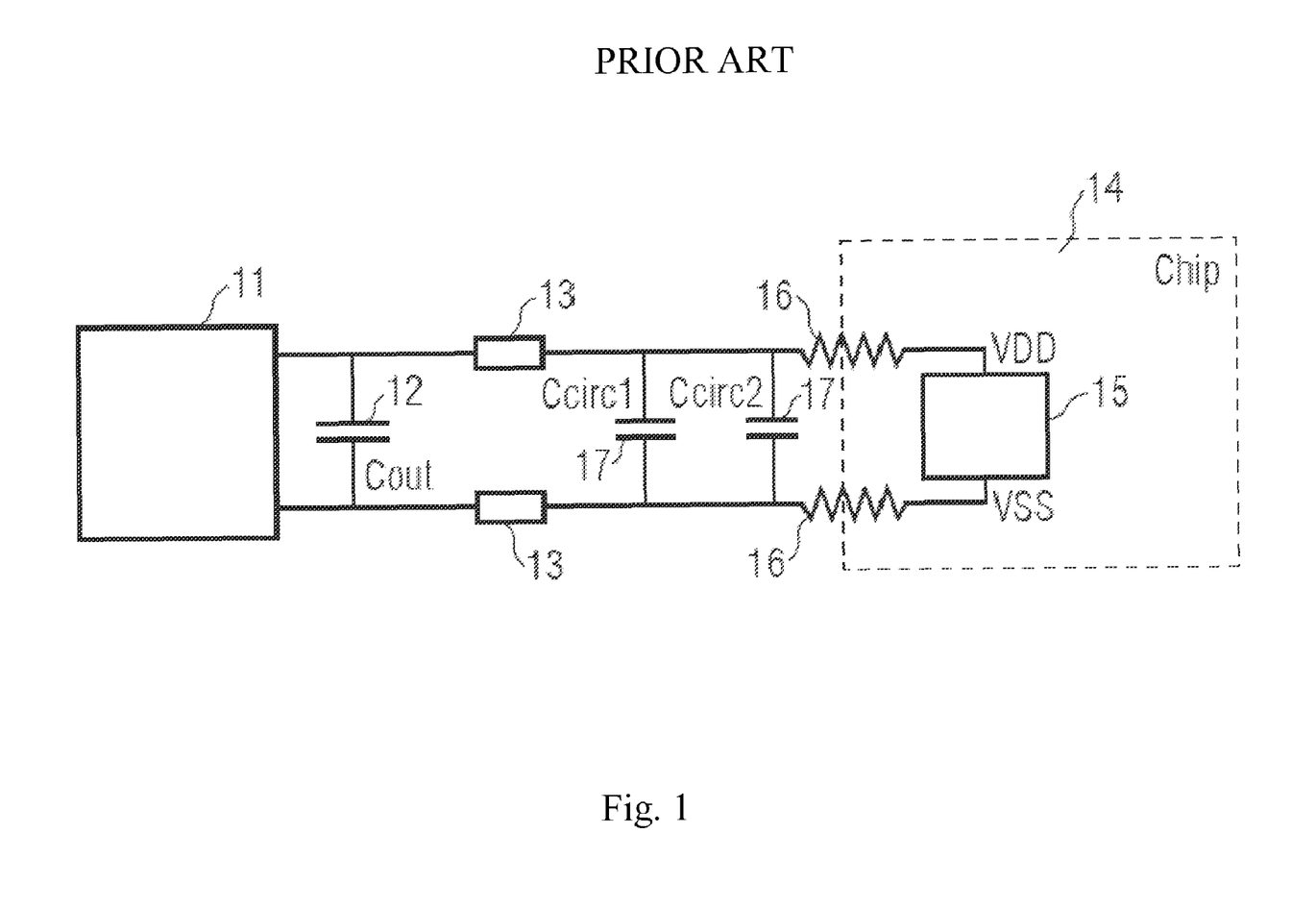
FIG. 1 illustrates a digital circuit according to prior art.
Figure 2:
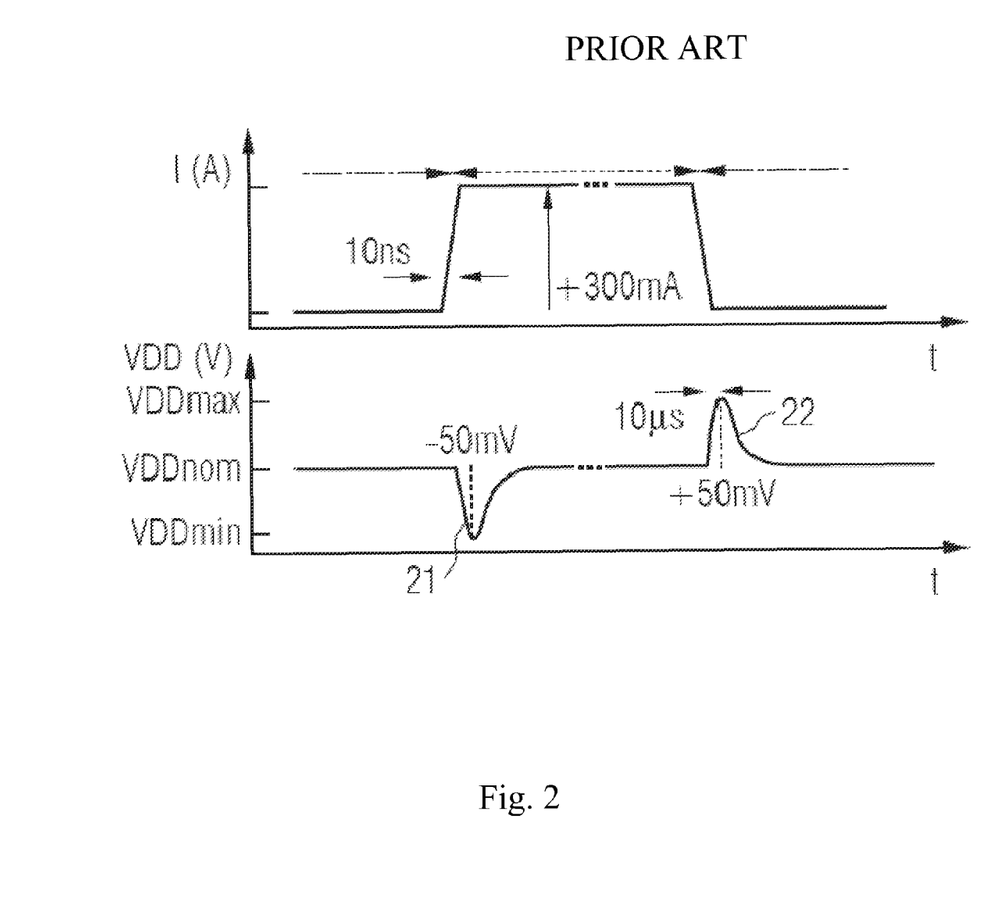
FIG. 2 illustrates a current change and the induced voltage fluctuations in a circuit of FIG. 1.

FIG. 1 shows a digital circuit unit on a circuit board or on a chip according to prior art. This has a voltage source 11 and a capacitor 12 Cout at the output of the voltage source or voltage generator. The resistances of the lines are symbolized by the two resistors 13. The voltage source 11 feeds a circuit block 15 arranged on a circuit board or a chip 14, bond or bump inductances 16 arising at the connection area of the circuit on the chip. To optimize the power supply, blocking capacitors 17 are provided, which serve to buffer charge for load changes. If the circuit block 15 is now to be activated as shown in FIG. 2, or if a load change occurs from a variation of the operating mode, conditioned for example by the activation of various circuit blocks, then a load change of 300 mA can arise within 10 ns, for example. In mobile telephones, for example, there can be load changes from 50 mA for speech processing to 350 mA for multimedia processing. The upper graph in FIG. 2 shows the current flow for the load change, the intervals not being drawn true to scale. The high or the lower activity can last about 1/10 sec., for example, while the transition between the different activities lasts 10 ns. The blocking capacitors 17 provided in FIG. 1 are too slow to be able to balance out such transient load changes, so that voltage fluctuations 21 and 22 arise in the supply voltage. These dynamic voltage fluctuations can be +/−50 mV, so that the supply voltage VDDnorm can fluctuate between VDDmax and VDDmin.

The dynamic or transient fluctuations of the voltage generators can be +/−50 mV, for example. This fluctuation amplitude means that in a variance at low values the switching speed is reduced by up to 10%, or that a maximum voltage lower by 50 mV must be used to exceed the maximum permissible voltage when a dynamic variance occurs at higher voltage values. A consequence of the latter is that the maximum possible switching speed becomes 10% lower.

The use of blocking capacitors to avoid these fluctuations in the supply voltage is known. This blocking capacitor is charged to the relevant supply voltage. If necessary, current or charge can then be released, when a sudden charge requirement occurs on a load change. Such blocking capacitors are additional components and must also have suitable dynamic properties as well as the necessary capacitance. Off-chip capacitors have the necessary capacitance, but do not prevent the voltage fluctuations caused by bond or bump inductances. Further known are on-chip capacitors, which are fast, but mostly only have a low capacitance and are expensive in their chip area requirement. Therefore a need exists to eliminate or reduce the dynamic fluctuations of the supply voltage.

BRIEF SUMMARY

A digital circuit unit includes at least one circuit block, a voltage source for supplying the circuit block, a detection unit, which monitors the change of current drain by the at least one circuit block, an additional power consumption unit, which upon activation consumes power in addition to the at least one circuit block, and a control unit, which controls the power consumption unit in such a way that upon a change in the power consumption of the circuit block the power consumption unit is activated and drains current.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention will now be further described in detail with reference to the accompanying drawings. Shown are.

DETAILED DESCRIPTION

Figure 3:
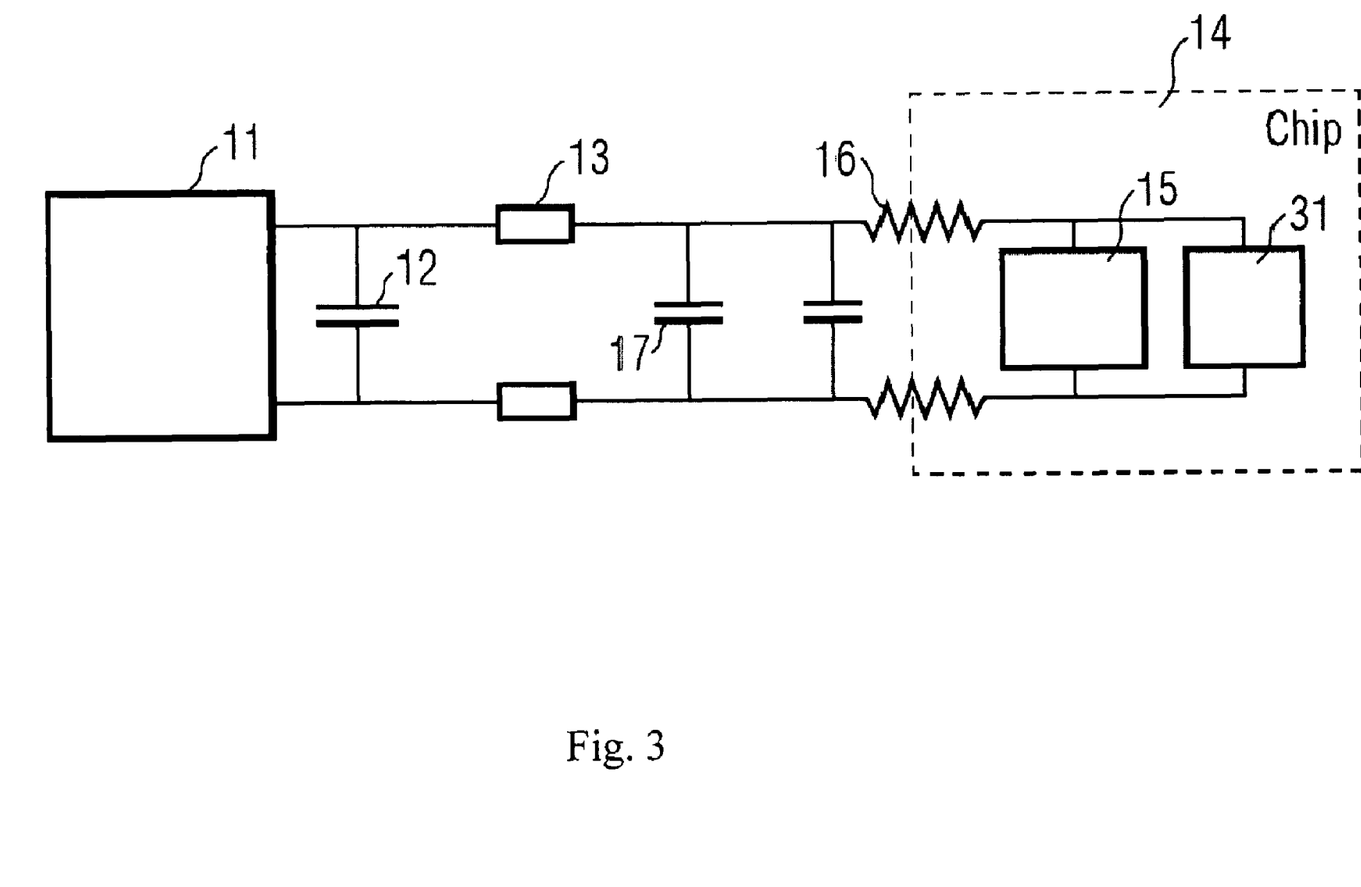
FIG. 3 illustrates a circuit unit.

To reduce disruptive voltage fluctuations, a circuit unit as shown in FIG. 3 is provided. The circuit shown in FIG. 3 is similar to the circuit shown in FIG. 1, so that similar elements carry the same reference numerals and are not described in further detail. To reduce the voltage fluctuations shown in FIG. 2, an additional power consumption unit 31 is provided on the circuit board or chip 14 beside the circuit block 15, this power consumption unit 31 being able to drain current additionally in the event of a load change.

Figure 4:
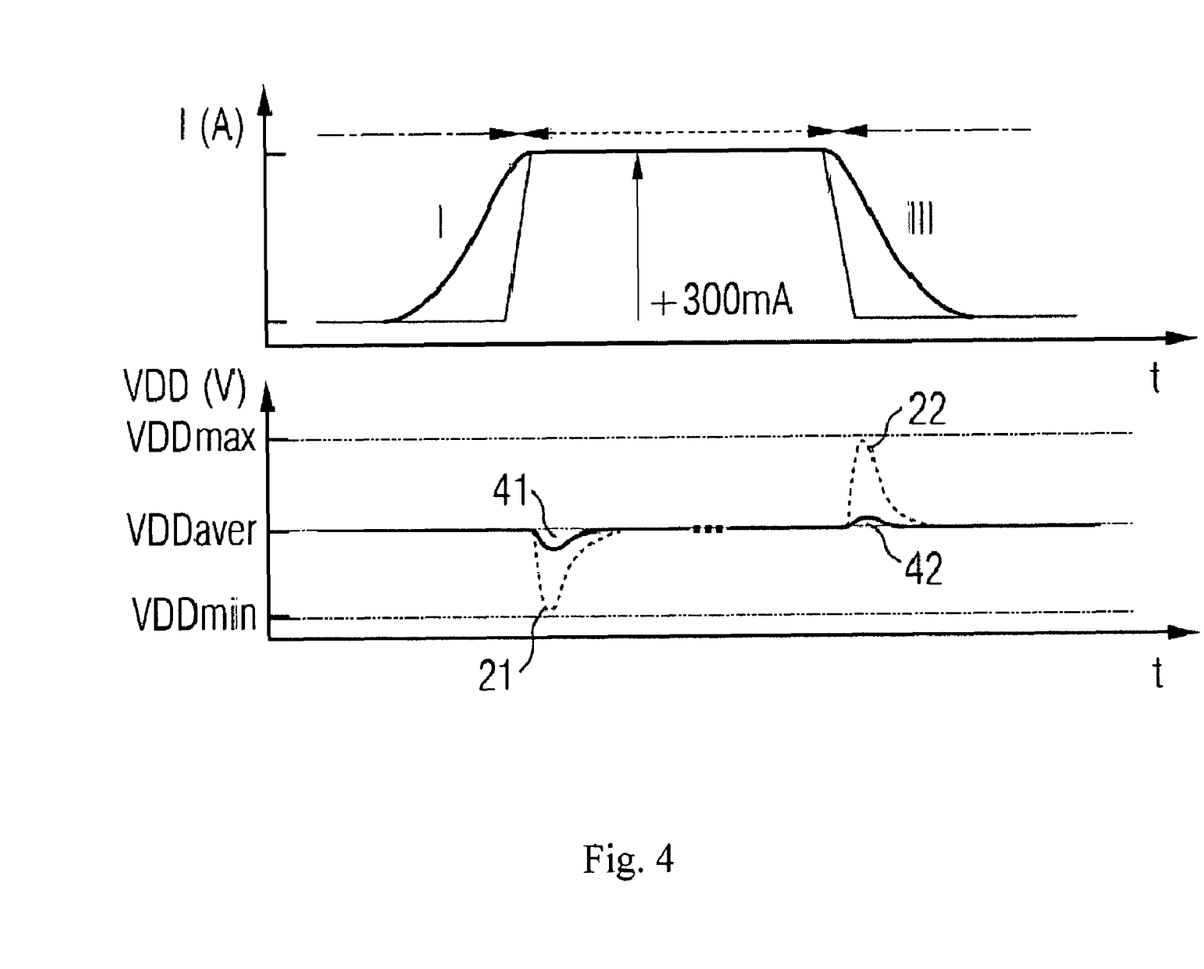
FIG. 4 illustrates a load change in the use of the circuit of FIG. 3.

FIG. 4 shows the current and voltage curve over the time, a load change again occurring within the circuit of +300 mA. The current flow without the power consumption unit 31 is shown with a thin line, while the current flow in the presence of the additional power consumption unit 31 is shown with I and III. As can be seen from the current flow of FIG. 4, if it is detected that a load change with increased load is imminent, the power consumption unit 31 is activated in such a way that over time it slowly drains current, before the load change occurs. The intervals are not shown true to scale. As was shown in the context of FIG. 2, the load change can occur within 10 ns, for example. The currents additionally impressed with I and III are preferably in the μs range, however. With this slow load change, the voltage curve of the voltage source 11, as shown below in FIG. 4, can be smoothed. When the load change actually starts, the power consumption of the power consumption unit is reduced so that the current is "handed over" to the circuit block. When the circuit block is fully activated, i.e. when the power consumption reaches the upper value shown in FIG. 4, the additional power consumption unit has stopped drawing additional current. The broken representation of the voltage curve corresponds to the representation of FIG. 2 without use of the additional power consumption unit 31. The solid line of the voltage curve describes the voltage curve for a load change where the power consumption unit 31 is additionally present.

As can be seen, the voltage fluctuations 41, 42 can be significantly reduced. With the resulting average voltage VDDave, the required maximum switching speed would be achieved for the associated voltage VDDmin. The power consumption by the recharging currents is set by the average voltage VDDave. The voltage fluctuations 41, 42 can be significantly reduced compared to the voltage fluctuations 21, 22. For the detection or monitoring of the supply voltage, a detection unit can be provided, which monitors the load change and is able to forecast the future power consumption. Alternatively, the load change can also be set by programming. Furthermore, a control unit can be provided, which controls the digital circuit unit such that upon a load change the supply voltage remains constant to some degree. A control unit takes over the control of the additional power consumption unit. The detection and control units are not shown individually and can be an element of other units, for example of the voltage generator 11.

Figure 5:
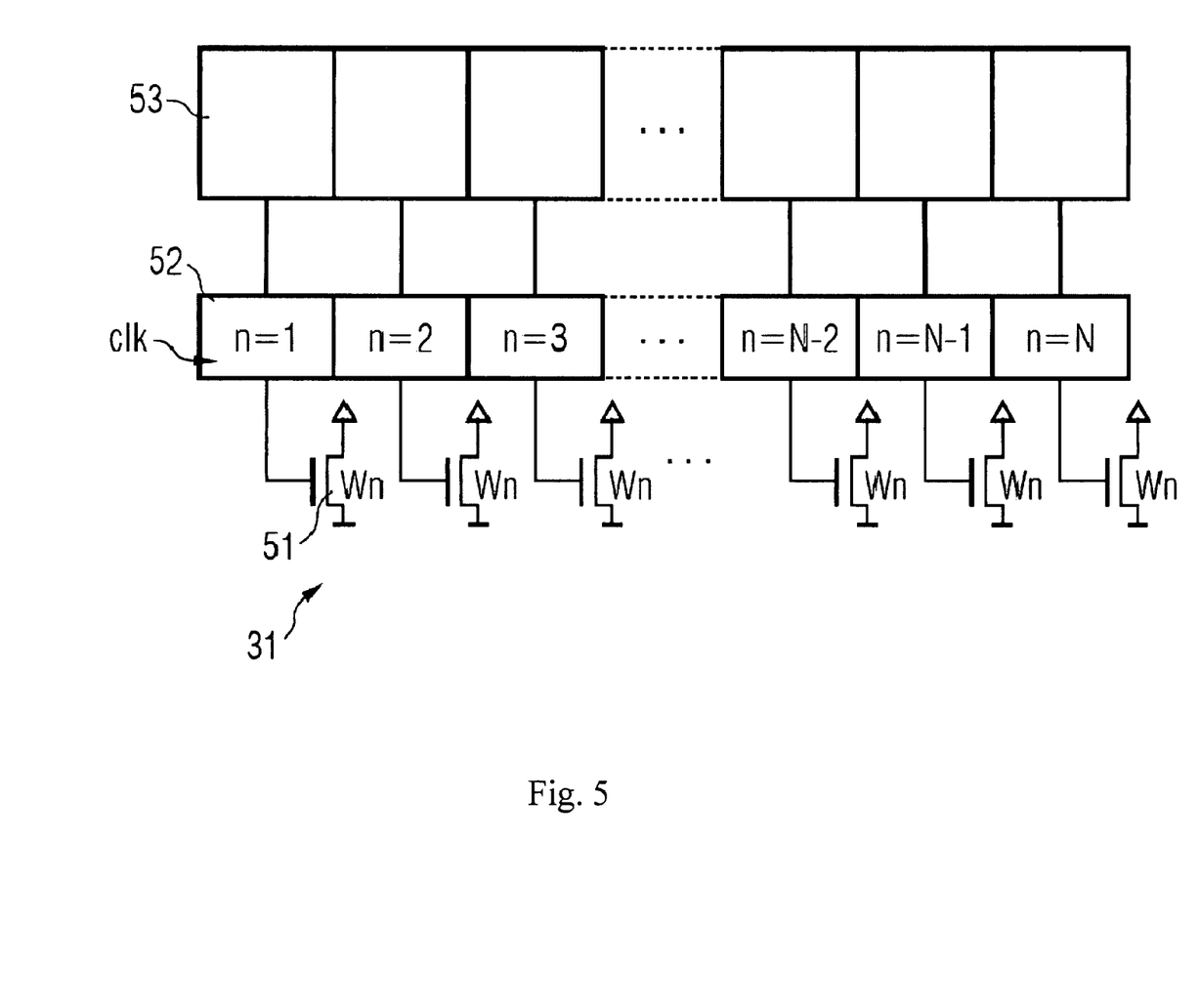
FIG. 5 illustrates an example power consumption unit.

FIG. 5 shows an additional power consumption unit 31 in more detail. As can be seen from FIG. 5, the power consumption unit has several power consumption elements 51 in the form of transistors. These transistors interface on one side to VDD and VSS, the gates of the transistors being connected in each case to flip-flops 52. The flip-flop elements 52 are running at clock clk and receive the data from a register unit 53. The register unit 53 can contain patterns of instruction sequences, which are passed to the flip-flops, and in the case shown the transistor is an NFET transistor. If for example the gate signal is at 1, the transistor becomes conducting, which generates an additional current drain of the transistor. If for example there is to be a load increase, as shown in FIG. 4 under I, then the individual transistors must successively drain current, so that a current flow is generated as shown with I in FIG. 4. For this, an instruction sequence must be passed from the register unit 53 to the flip-flops 52 in such a way that, in the example shown, more and more flip-flops have a 1, so that an additional current drain is generated with the desired time characteristics. In the case of a PFET transistor, for example, there would have to be a 0 on the gate signal for an additional current drain. Naturally, any form of control of the transistors is possible, while it must be ensured that they can individually be made conducting. Furthermore, the transistor widths in the power consumption unit 31 can be selected variously. In one embodiment the width of a transistor 'n+1' could be twice as great as the width Wn of the transistor 'n'. Since the power consumption is proportional to the transistor width, a smooth time characteristic can be achieved with a scaling of this nature.

In many applications in which such digital circuit units are used, two different operating modes with different supply voltages are possible (for example one operating mode with 0.9V supply voltage and another operating mode with 1.2V supply voltage). If, for example, the system control sends notification that an operating mode involving a sharp load increase should be selected, it can be necessary to select the higher operational voltage. The switch from a low operational voltage to a higher operational voltage is normally in the range of a few μs. Within this time, the additional power consumption unit 31 can also be activated to realize a current flow as shown by the characteristic I in FIGS. 4 and 6.

Figure 6:
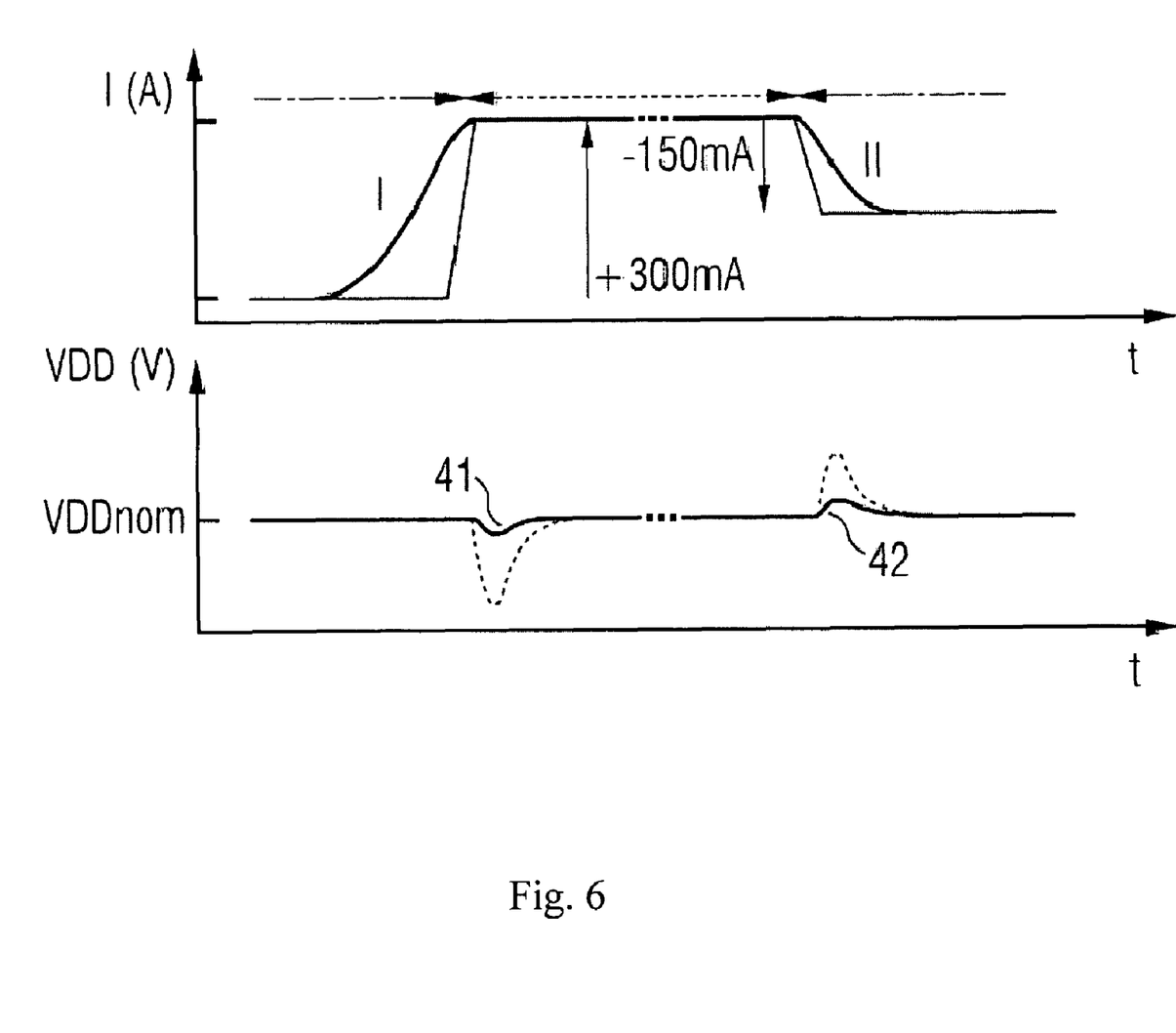
FIG. 6 illustrates an example load change with different values and a conditioned voltage change.

FIG. 6 represents the case that the system is changed from a low current load to a high current load, while afterwards the system is returned to an average current load. The impressed current flow from the additional power consumption unit is shown with I and II using the thicker lines. The characteristic of the additionally impressed current can be different for the two switching operations in relation to amplitude and duration. In the case of a load change from a higher load to a lower load, the current no longer needed by the circuit block is first led over the additional power consumption unit 31, so that in this case when the current load is reduced, a large number of transistors 51 must initially be activated, which can gradually be deactivated to lead to a falling power consumption, as shown by II or III.

Figure 7:
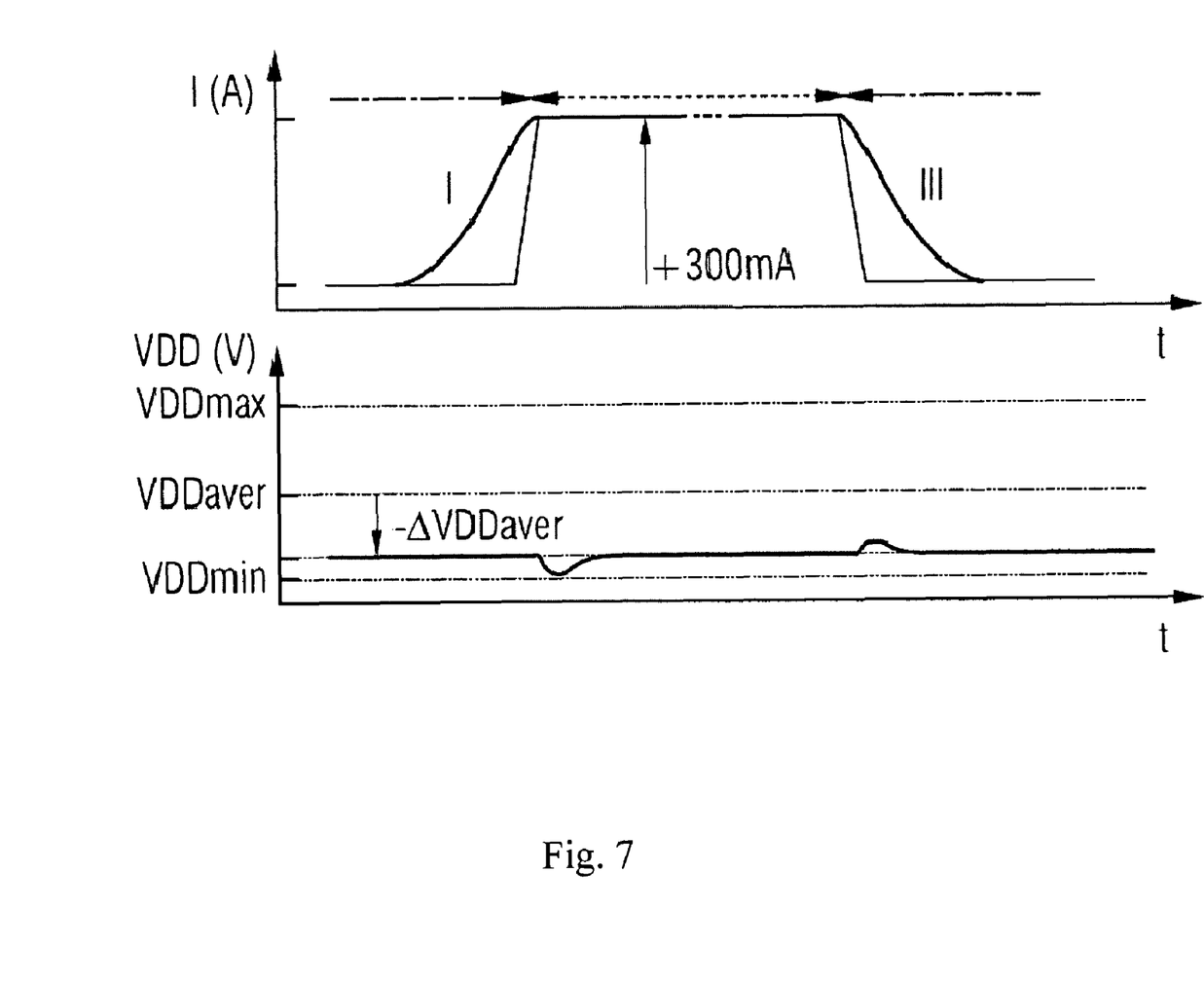
FIG. 7 illustrates an example load change for a reduced supply voltage.

The resulting lower voltage fluctuations 41 and 42 of FIGS. 4 and 6 can now be used to raise the average level of the supply voltage, to obtain a faster processing capacity, or to lower the average level to save power dissipation. FIG. 7 represents the case in which the lower voltage fluctuations caused the average voltage potential VDDave to be lowered by ΔDDave. The same processing capacity is now achieved, in comparison to FIG. 6, with an operational voltage lowered by ΔVDDave. With a supply voltage 40 mV lower, for example, around 7% power can thus be saved.

Figure 8:
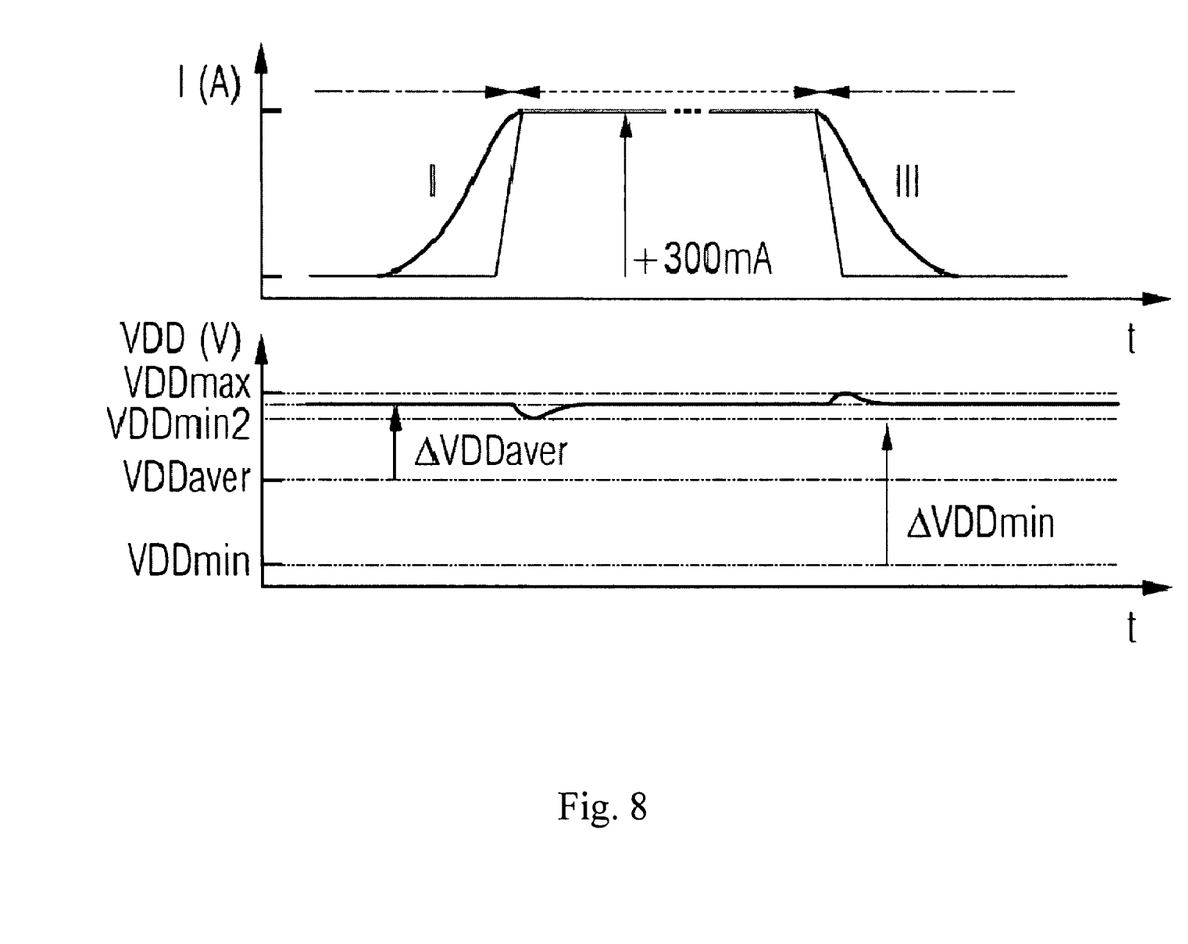
FIG. 8 illustrates an example load change for a raised average supply voltage.

FIG. 8 shows how the smaller supply fluctuations can be used to achieve a higher processing capacity. As is shown in FIG. 8, the average supply voltage can be raised from VDDave by ΔVDDave. The minimum processing capacity is now achieved with VDDmin2, a value that is ΔVDDmin higher than in prior art, when no additional power consumption unit is used. The processing capacity of the circuit with the additional power consumption unit is thus higher compared to prior art.

In summary the disclosure enables the dynamic fluctuations in the circuit unit to be considerably reduced, as a result of which either a higher minimum voltage, and thus a higher maximum processing capacity can be achieved, or for the same processing capacity a lower supply voltage is necessary, which leads to lower power consumption during operation.

It is therefore intended that the foregoing detailed description be regarded as illustrative rather than limiting, and that it be understood that it is the following claims, including all equivalents, that are intended to define the spirit and scope of this invention.

The invention claimed is:

1. Digital circuit unit, comprising
   at least one circuit block;
   a voltage source configurable to supply the at least one circuit block;
   an additional power consumption unit, which upon activation consumes a power in addition to the at least one circuit block, wherein the additional power consumption unit comprises more than one power consumption elements, wherein the more than one power consumption elements are individually activated based on a quantity of current to be drained; and
   a control unit configurable to control the power consumption unit such that upon a change in the power consumption of the at least one circuit block the power consumption unit is activated and drains current.

2. The circuit unit of claim 1, wherein a reduction in the power consumption by the at least one circuit block is detected by at least one of a detection unit or a signal by a program module, wherein the control unit is operable to control the power consumption unit such that the control unit is operable to control the of a falling current drain by the circuit block.

3. The circuit unit of claim 2, wherein the more than one power consumption elements comprises transistors.

4. The circuit unit of claim 2, wherein the more than one power consumption elements are each controlled by a flip-flop.

5. The circuit unit of claim 4, wherein a memory unit or a register unit is provided, wherein the memory unit or the register unit is operable to pass control data that activates or deactivates the transistors to the flip-flops.

6. The circuit unit of claim 3, wherein the more than one power consumption elements comprise NFET transistors, wherein outputs of the flip-flops are connected to gate electrodes of the NFET transistors.

7. The circuit unit of claim 3, wherein transistor widths in the power consumption unit are variously selected.

8. The circuit unit of claim 1, wherein, for a pending current rise of the at least one circuit block, the power consumption unit is operable to drain additional current before the pending change of a power consumption of the at least one circuit block.

9. The circuit unit of claim 8, wherein the power consumption unit is operable to consume power until a forecast current rise by the at least one circuit block, wherein a consumption of the power consumption unit is reduced when the power consumption of the at least one circuit block starts to rise.

10. The circuit unit of claim 8, wherein the consumption of power of the additional power consumption unit is stopped, if the power consumption of the at least one circuit block reaches a predicted higher value.

11. The circuit unit according to claim 8, wherein the consumption of the additional power consumption unit is stopped when the current of the at least one circuit block has reached a forecast raised current value.

12. A voltage regulator stabilizing a voltage of a power supply supplied to a load, comprising:
    a power supply supplying a power to the load;
    an additional power consumption unit that upon activation consumes an additional power in addition to the load, wherein the additional power consumption unit comprises a plurality of power consumption elements, wherein the power consumption elements are individually activated based on a quantity of currents to be drained; and
    a prediction unit operable to predict a power consumption of the load, wherein, upon detection that an increase of power consumption of the load is predicted, the additional power consumption unit is activated and drains current before a change of power consumption of the load starts.

13. The voltage regulator of claim 12, wherein a consumption of the additional power consumption unit decreases when the power consumption of the load starts to increase.

14. The voltage regulator of claim 12, further comprising a detection unit operable to detect a reduction in the power consumption by the load, wherein the additional power consumption unit drains an additional current in an event of a falling current drain by the load.

15. The voltage regulator of claim 14, wherein the plurality of power consumption element comprise transistors.

16. The voltage regulator of claim 14, wherein the plurality of power consumption elements are each controlled by a flip-flop.

17. The voltage regulator of claim 16, wherein a memory unit or register unit is provided, wherein the memory unit or the register unit is operable to pass control data that activates or deactivates the transistors to the flip-flops.

18. The voltage regulator of claim 15, wherein the plurality of power consumption element comprise NFET transistors, wherein outputs of the flip-flops are connected to gate electrodes of the NFET transistors.

19. The voltage regulator of claim 15, wherein transistor widths in the power consumption unit are variously selected.

20. The voltage regulator of claim 13, wherein the consumption of power of the additional power consumption unit is stopped when a predicted power consumption increase occurs and the power consumption has reached a predicted higher value.

21. A voltage stabilizer stabilizing the voltage of a power supply line, comprising:
    at least one block;
    a power supply operable to supply the at least one circuit block;
    a power consumption unit that consumes power in addition to the least one circuit block upon activation, wherein the power consumption unit comprises power consumption elements that are individually activated depending on a quantity of currents to be drained,
    detecting means for detecting a change in a power consumption of the at least one circuit block,
    means for predicting the power consumption of the least one circuit block, wherein, when the means for predicting the power consumption predicts an increase of the power consumption of the at least one circuit block, the power consumption unit is activated and draws current before a change of power consumption of the at least one circuit block starts, the power consumption of the power consumption unit reduced when the power consumption of the at least one circuit block starts to rise.

22. The voltage stabilizer of claim 21, wherein, when a reduction in the power consumption by the at least one circuit block is detected, the power consumption unit drains additional currents in the event of a falling current drain by the at least one circuit block.

23. The voltage stabilizer of claim 22, wherein the power consumption elements comprise transistors.

24. The voltage stabilizer of claim 22, wherein the power consumption elements are each controlled by a flip-flop.

25. The voltage stabilizer of claim 24, further comprising a memory unit operable to pass control data that activates or deactivates the transistors to the flip-flops.

26. The voltage stabilizer of claim 23, wherein transistor widths in the power consumption unit are variously selected.

27. A method for controlling a digital circuit unit, which comprises at least one circuit block that is supplied by a voltage source, the method comprising:
monotoring a change in a power consumption by the least one circuit block; and
activating an additonal power consumption unit that consumes an additional power in addition to the at least one circuit block when a change of the power consumption of the at least one circuit block is detected, wherein the additional power consumption unit comprises power consumption elements, and wherein activating the additonal power consumption unit comprises individually activating the power consumption elements depending on a quantity of currents to be drained.

28. The method of claim 27, further comprising draining, by the additional power consumption unit, a current no longer needed by the at least one circuit block when a reduction in the power consumption by the at least one circuit block is detected.

29. The method of claim 27, further comprising additional draining, by the additional power consumption unit, additional current, when a current rise is forecast for the at least one circuit block, before the forecast current rise occurs in the at least one circuit block.

30. The method of claim 27, further comprising activating the additional power consumption unit when the power consumption increases by a factor of two and when the power consumption changes in a time constant less than approximately 1 microsecond.

31. The method of claim 27, further comprising activating the additional power consumption unit when the power consumption increases by a factor of two, or when the power consumption changes in a time constant less than approximately 1 microsecond.

32. The method of claim 29, further comprising reducing the consumption of power by the additional power consumption unit when the power consumption of the at least one circuit block starts to rise.

33. The method of claim 29, further comprising terminating the power consumption of the additional power consumption unit when the increase of the power consumption of the circuit block has taken place and the power consumption has reached the increased value.

34. An apparatus for controlling a digital circuit unit, which comprises at least one circuit block that is supplied by a voltage source, the method comprising:
means for monotoring a change in a power consumption by the least one circuit block; and
means for activating an additional power consumption unit that consumes power in addition to the least one circuit block when a change of a power consumption of the at least one circuit block is detected, wherein the additional power consumption unit comprises power consumption elements, and wherein the means for activating the additional power consumption unit comprises means for individually activating the power consumption elements depending on a quantity of currents to be drained.

* * * * *